United States Patent [19]

Bauer et al.

[11] Patent Number: 5,829,890
[45] Date of Patent: Nov. 3, 1998

[54] BEARING ASSEMBLY AXIAL LOAD APPLICATION

[75] Inventors: Bernhard Bauer, Hassfurt; Burkhard Buchheim, Schweinfurt; Thomas Helfrich, Hamback; Christian Knoche; Lothar Meidl, both of Schweinfurt; Arno Stubenrauch, Aidhausen; Jurgen Theuerer, Kolitzheim, all of Germany

[73] Assignee: SKF GmbH, Germany

[21] Appl. No.: 881,655

[22] Filed: Jun. 24, 1997

[30] Foreign Application Priority Data

Jun. 28, 1996 [DE] Germany .......................... 196 25 930.4

[51] Int. Cl.⁶ ..................................................... F16C 19/14
[52] U.S. Cl. ............................................. 384/455; 384/620
[58] Field of Search ..................................... 384/452, 453, 384/454, 455, 618, 619, 620, 621, 622, 568

[56] References Cited

FOREIGN PATENT DOCUMENTS 709768   10/1955   Germany .
1171273   2/1960   Germany .

*Primary Examiner*—Thomas R. Hannon
*Attorney, Agent, or Firm*—Eugene E. Renz, Jr., PC

[57] ABSTRACT

A bearing arrangement is equipped with a radial bearing and with a roller bearing which acts purely in the axial direction. Rollers of axial bearing have a needle-like, barrel-like design. Bearing rings are provided with the corresponding profiles. When axial play develops in the bearing arrangement, rollers shift radially under the effect of gravity in one case and under the effect of centrifugal force in the other with the effect of eliminating the axial play.

4 Claims, 1 Drawing Sheet

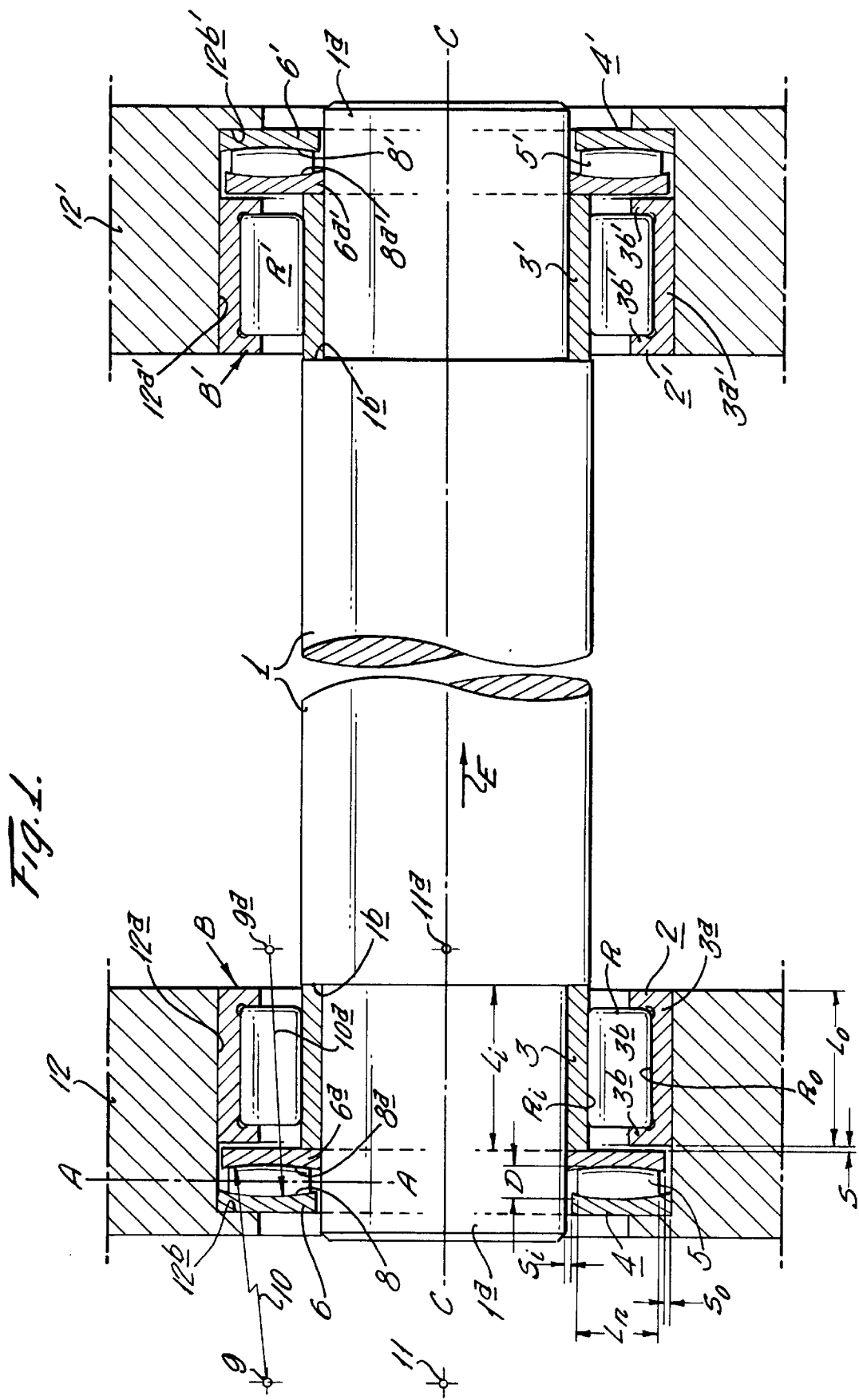

BEARING ASSEMBLY AXIAL LOAD APPLICATION

BACKGROUND OF THE INVENTION

For some bearing applications, wherein the bearings are subjected to combined radial and axial loads, typically conical roller bearings or angular-contact ball bearings are used. In some applications, such as gear trains subjected to heavy combined loads, it has been observed that wide temperature fluctuations are likely to occur and therefor it is necessary to plan for continuous changes in the amount of axial play, especially in the case of transmission shafts supported at both ends.

Additionally, in some instances, extremely high axial thrust forces occur when the bearing assembly changes directions and in the case of helical gears, displacements also occur as a function of the load. In these applications, when conical roller bearings are utilized, the optimum adjustment can be made only for a single set of actual operating conditions. For all other sets of operating conditions deviating from the single case, it is necessary to accept compromises which can produce cold running, overheating, load reversals, deflections of the shaft and other undesirable conditions.

In accordance with German patent DE 1,171,273, thermal expansion of the components is compensated for by pretensioning the conical roller bearings. However, some of the other harmful effects noted above are also characteristic of the transmission as shown in the German patent DE 1,171,273.

German patent application 7,097,769 shows a shaft bearing assembly wherein the axial and radial loads are divided between a cylindrical roller bearing and an axial conical roller bearing. In order to prevent the destruction of the bearings under the types of influences and operating conditions as those cited above, the relatively rigid axial bearing arrangement needed to be given a certain resilience through the installation of a spring washer acting in the axial direction. However, in this case as well, the amount of pretension changes as the operating conditions change and there is no way of preventing the entire shaft from having a certain amount of play under high axial loads.

SUMMARY OF THE INVENTION

With the foregoing in mind, it is an object of the present invention to provide a bearing assembly characterized by novel features of construction and arrangement providing a bearing which is free of axial play under all operating conditions. To this end, and in accordance with the present invention, the axial bearing is provided with barrel-shaped rollers and complementary raceways. The barrel-shaped rollers are preferably installed with their axes extending in the radial direction, and are preferably mounted in a manner to allow freedom to shift slightly in the radial direction. The bearing is thus not under any pretension, not even under the most unfavorable conditions of maximum thermal expansion. At rest, the force of gravity causes the rollers at the top and bottom, because of their weight, to move between the narrowing raceways of the bearing rings and consequently the axial play is reduced to zero. During operation, the centrifugal force of the rollers is more powerful and consequently the rollers are moved radially outwardly on all sides producing the same effect of eliminating the play between the narrowing raceways.

In summary, a bearing arrangement according to the present invention is therefore free of axial play under all operating conditions and is especially suitable for transmission subjected to very heavy loads.

BRIEF DESCRIPTION OF THE DRAWINGS

These and other objects of the present invention and various features and details of the operation and construction thereof are hereinafter more fully set forth with reference to the accompanying drawings, wherein:

FIG. 1 shows a longitudinal section through a bearing arrangement and in accordance with the present invention comprising a cylindrical roller bearing and an axial roller bearing with barrel-shaped needles.

DETAILED DESCRIPTION OF THE PREFERRED EMBODIMENT

Referring now to the drawing, particularly FIG. 1 thereof, there is shown a bearing arrangement in accordance with the present invention generally designated by the alphanumeric "B". The bearing arrangement B as illustrated is mounted at opposite terminal ends of a shaft 1 of a transmission, the shaft having a reduced terminal end 1a defining circumferentially extending shoulder 1b. The bearing arrangement B is mount in the bore 12a of housing 12 which defines a circumferentially extending shoulder 12b. As illustrated, the bearing arrangement is mounted between the confronting shoulders 1b, 12b of the reduced terminal end of the shaft and housing respectively.

Each bearing arrangement B comprises a pair of roller bearings 2 and 4 designed to absorb axial and radial forces separately. Considering first the bearing 2 comprises inner and outer rings 3 and 3a respectively which have confronting spaced raceways $R_i$ and $R_o$ for a plurality of cylindrical rollers R. In the present instance, the outer ring 3a has radially inwardly extending flanges 3b, 3b at opposite axial ends and the inner ring is flangeless to permit the rollers R to move freely in the axial direction on the reduced end of the shaft 1a. As illustrated, the inner ring 3 is of a slightly greater length $L_i$ than the length $L_o$ of outer ring 3a to provide a space S between the bearings 2 and 4.

The bearing arrangements at opposite ends of the shaft are identical and therefore the reference numerals at the right hand end are the same as those on the left hand end of the shaft except they are provided with a prime.

The bearing arrangement of the present invention includes an axial roller bearing 4 with barrel-shaped needles 5 for absorbing axial forces. The needles 5 are slender and are provided with a large radius of curvature 10. Preferably, the needles 5 have a length $L_n$ approximately four times the largest diameter D as measured in the center of the needles 5. The axes A—A of the needle rollers are oriented in the radial direction. The axial roller bearing 4 has two bearing rings 6, 6a having correspondingly curved raceway profiles 8, 8a and conforming with the radially oriented symmetrical needle rollers 5. The center 9 of the radius of curvature 10 of raceway profile 8a lies on a circle whose center 11 is located on the central axis C—C of the bearing arrangement. The center 9a of radius of curvature 10a of raceway profile 8 lies on a circle whose center 11a is likewise located on the central axis C—C of the bearing arrangement. The rings 6, 6a are staggered radially to provide a space $S_i$ between the ring 6 and shaft 1a and a space $S_o$ between the ring 6a and housing bore 12a.

When the operating conditions change through the influence of temperature, load, etc., and cause, for example, the end of shaft 1 to shift slightly in housing 12 in the direction of arrow E, the distance between bearing rings 6, 6a of axial roller bearing 4 increases. When the shaft is at rest, upper and lower needles 5 shown will move downward under the effect of gravity. Because of their convex shape, the thicker central sections will slide down between the narrowing raceway profiles 8 of bearing rings 6 and eliminate the axial play. During operation, centrifugal force is more powerful, and the two needles 5 shown will slide radially outwardly with the same result. Because of the continuous rolling motion which occurs during operation, the static friction effect plays no role in spite of the small partial crowning angles at needles 5 and raceways 8, 8a. As a result, it is ensured that the needles 5 will continuously adjust and readjust their positions and thus prevent axial play no matter what the operating conditions.

The use of the invention in a transmission as shown and described above is given only by way of an example. The features according to the invention, can be used to equal advantage in the case of rolls, rollers, wheels, motors, spindles, conveying device—in short, anywhere the axial play caused by operating conditions, age, or wear is to be automatically compensated.

What is claimed is:

1. A bearing combination for rotationally supporting an elongated shaft in a housing having a bore about an axis (C—C) comprising a first bearing assembly having spaced race rings (6, 6a) extending generally transverse radially to the axis (C—C) of the shaft and a complement of barrel-shaped needles (5) between the confronting raceway surfaces of the race rings (6, 6a), one of said race rings confronting a shoulder defining the bore in the housing and spaced from the periphery of the shaft and the other race ring engaging the shaft and spaced radially from the bore of the housing, a second roller bearing assembly comprising inner and outer axially extended rings and a plurality of rollers in the space between the rings, one of said rings being greater in length than the other ring to provide a space (S) between the first and second bearing assemblies whereby axially shifting of the shaft due to temperature load and other conditions permits a corresponding axial movement of said race rings relative to one another and consequent radial displacement of the needles which continuously adjust and re-adjust their positions and thus prevent axial play in the bearings under all operating conditions.

2. The combination as claimed in claim 1, wherein said barrel-shaped needles (5) having a length ($L_n$) approximately four times the largest diameter (D) of the needles.

3. The combination as claimed in claim 1, wherein the center (9) of the radius of curvature (10) of the raceway profile (8a) of said one race ring lies on a circle whose center (11) is located on the axis (C—C) of the bearing and wherein the center (9a) of the radius of curvature (10a) of the raceway profile (8) of said other race ring lies on a circle whose center (11a) is located on the axis (C—C) of the bearing.

4. The combination as claimed in claim 1, wherein the race ring of said first bearing assembly remote from the second bearing engaging in the bore of the housing and spaced radially from the shaft and wherein the other race ring of said first bearing and wherein the inner ring of said second bearing assembly abuts the other race ring of said first bearing assembly and wherein the outer ring of the second bearing assembly is spaced axially from the other race ring of said first bearing assembly.

\* \* \* \* \*